United States Patent Office 2,733,266
Patented Jan. 31, 1956

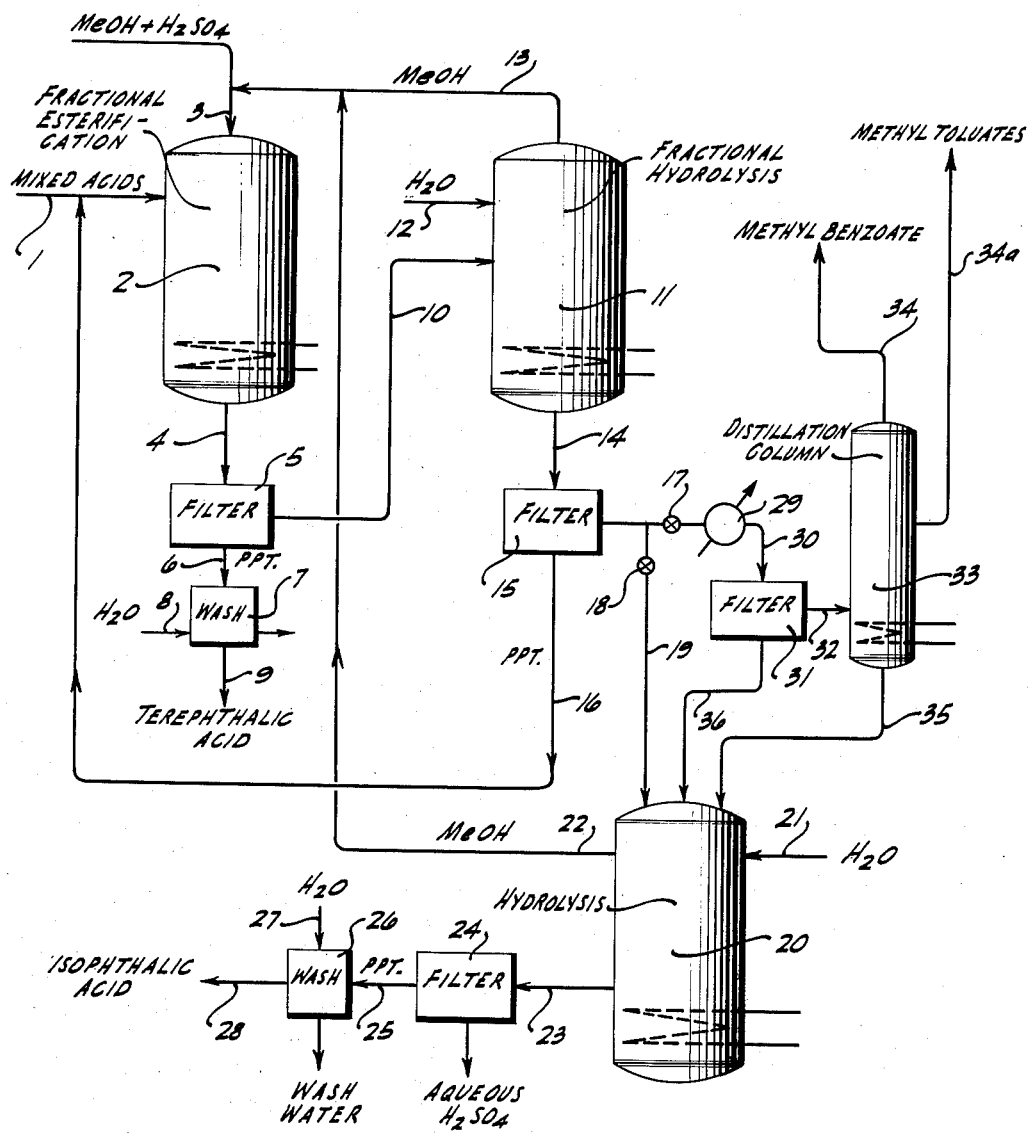

2,733,266

PREPARATION OF ISOPHTHALIC AND TEREPHTHALIC ACIDS

Art C. McKinnis, Long Beach, Calif., assignor to Union Oil Company of California, Los Angeles, Calif., a corporation of California Application June 16, 1952, Serial No. 293,853

7 Claims. (Cl. 260—525)

This invention relates to the separation and purification of mixtures of isophthalic and terephthalic acids, which mixtures may contain in addition certain monocarboxylic acids such as benzoic or toluic acids. Acid mixtures of this character may be obtained as a result of various oxidation procedures in which mixtures of the isomeric xylenes, with or without ethylbenzene, are oxidized, either in a single stage or in a plurality of stages to form mixtures of the above-named acids. The particular methods employed herein for separating the acids are based upon the discovery that the esterification rate of terephthalic acid under the conditions herein described is substantially less than that of isophthalic acid, or of benzoic or toluic acids.

The process consists more specifically in subjecting a mixture of the above acids to fractional esterification with an alcohol or other esterifying agent until substantially all of the monocarboxylic acids and the greater part of the isophthalic acid have been converted to the corresponding esters, and then separating from the mixture the substantially unesterified terephthalic acid. The invention also embraces a partial hydrolysis of the ester fraction of the esterification mixture in order to selectively de-esterify any terephthalic acid which was esterified, the terephthalic esters being more readily saponifiable than the isophthalic, toluic, or benzoic esters. The remaining mixture of unhydrolyzed esters is then separated into its components, as will be more particularly described hereinafter.

The aromatic dicarboxylic acids, particularly terephthalic acid, have recently become highly important commercial materials by virtue of their use in the manufacture of certain synthetic polymers such as "Dacron." In the past, terephthalic acid has generally been manufactured by the controlled oxidation of pure para-xylene. Such processes, as a practical matter, must be performed in two separate stages, the first stage involving low temperature catalytic oxidation of the para-xylene to para-toluic acid and the second stage involving a higher temperature, liquid phase, non-catalytic oxidation of the toluic acid to terephthalic acid. This process is economically undesirable in that it requires as the starting material substantially pure para-xylene.

Para-xylene is ordinarily obtained as a by-product from certain petroleum fractions, especially reformate fractions obtained by the hydroforming of naphthenic petroleum fractions in the presence of certain catalysts such as cobalt molybdate or platinum. From these aromatic fractions may be obtained, as a close boiling cut, a mixture of meta-, para-, and ortho-xylene and ethylbenzene, which mixture boils between about 135° C. to 145° C. The ortho-xylene is the highest boiling material, boiling at 144° C. and is hence ordinarily removed by fractional distillation. However, the remaining mixture of meta- and para-xylene and ethylbenzene is difficult to separate into the pure components. A great variety of methods have been proposed for separating this mixture, but all the known methods are difficult and expensive. At present the most practical commercial method for separation consists of repeated fractional recrystallizations. However, this method requires the use of very low temperatures and a large number of crystallization stages in order to obtain pure para-xylene. Other methods which have been proposed, such as selective sulfonation, have never been commercially adopted.

This invention obviates the difficulties involved in the xylene separation problem by providing an economical method for separating the oxidation products of the para-xylene, meta-xylene, ethylbenzene mixtures. The oxidation of meta-xylene produces either meta-toluic acid or isophthalic acid, depending upon whether the oxidation is carried to completion. Para-xylene similarly yields either para-toluic acid or terephthalic acid, and ortho-xylene gives ortho-toluic acid or phthalic acid. Ethylbenzene yields primarily benzoic acid. The present invention makes feasible the oxidation of para-xylene, meta-xylene mixtures, with or without ethylbenzene, to produce mixtures of the above acids, and the acids are then separated by selective esterification and saponification.

It is therefore the principal object of this invention to provide economical means for separating mixtures comprising isophthalic and terephthalic acids.

A further object is to avoid the necessity of separating the $C_8$ aromatic hydrocarbon isomers prior to the oxidation thereof for the production of dibasic acids.

A further object is to provide means whereby substantially pure terephthalic acid may be obtained from mixtures thereof with isophthalic acid.

A further object is to provide economical means for separating oxidation mixtures obtained by the oxidation of meta-xylene, para-xylene, ethylbenzene mixtures into the respective pure carboxylic acids.

These and other objects are achieved by the process more specifically described hereinafter.

As indicated above, an essential feature of this invention resides in the utilization of the difference in esterification rates under certain conditions of isophthalic and terephthalic acids. In utilizing this phenomena a mixture of the acids is subjected, either in a continuous or batchwise operation, to esterification with, preferably, a lower aliphatic alcohol in the presence of an esterification catalyst such as sulfuric or hydrochloric acid. The esterification reaction is carried to any degree of completion short of complete esterification of the mixture. At any point short of complete esterification, the unesterified fraction will be found to contain a substantially larger proportion of terephthalic acid than was contained in the original mixture. If the esterification is carried on for a substantial period of time, or under severe esterification conditions, part of the terephthalic acid may become esterified. The esterified terephthalic acid, together with the isophthalic esters, may then be subjected to fractional hydrolysis by heating in the presence of added water and a hydrolysis catalyst such as sulfuric acid or hydrochloric acid, preferably with continuous removal of the hydrolyzed alcohol. Under these conditions it is found that the terephthalate esters are hydrolyzed in preference to the isophthalate, benzoic or toluic esters. However, some of the isophthalic esters may be hydrolyzed also, and it is hence preferred to separate the total mixture of acids precipitated during hydrolysis and recycle it to the fractional esterification step for further purification.

The unhydrolyzed residue from the hydrolysis reaction consists of the isophthalate esters, together with any benzoic or toluic esters which may be present. The benzoic and/or toluic esters may then be separated from the isophthalic esters by distillation, or any other convenient method. The remaining isophthalic ester may then be utilized as such, or it may be further hydrolyzed to obtain pure isophthalic acid.

While this invention is described particularly with reference to the separation of the mixed oxidation product obtained from the C₈ aromatic hydrocarbons, it is equally applicable to the separation of any mixture of isophthalic and terephthalic acids. The esterification agent employed herein is preferably a lower aliphatic alcohol. Methanol is the most satisfactory material, inasmuch as it may be readily removed from the hydrolysis reaction as it is formed, and does not form azeotropes with the water present. This is an important advantage, inasmuch as the alcohol should be substantially anhydrous for recycling to the esterification step. Other alcohols may be employed such as ethanol, propanol, isopropanol, butanol, tert. butanol, cyclohexanol, etc. In addition, other esterifying agents may be employed than the alcohols, e. g., the corresponding olefins, ethers, or esters.

The process may perhaps be more readily understood by reference to the accompanying flow sheet which shows one feasible method of operation. The invention should not, however, be considered as limited to this particular illustrative procedure.

The mixture of carboxylic acids to be separated is first passed through line 1 into a fractional esterification vessel 2. The esterifying agent, for example, methanol, together with the esterification catalyst such as sulfuric acid is introduced through line 3. The mixture of methanol, acids and catalyst is then heated and agitated in the vessel 2 for a sufficient length of time to give a substantial but incomplete esterification of the mixture. The temperature employed may be the reflux temperature of the mixture, i. e. from about 70° C. to 100° C., or a pressure vessel may be employed and the temperature raised to 300° C. to 400° C. It is preferable to employ an excess of methanol, such for example, as about 1 to 15 moles thereof for each mole of carboxyl groups present in the mixture. It is also distinctly preferable to employ in the esterification step only sufficient of the acidic catalyst to give a reasonably rapid reaction rate; higher proportions of catalyst tend to increase the solubility of terephthalic acid, and thereby increase its relative esterification rate. In using sulfuric acid it is preferable to employ between about 0.1% and 10% by weight thereof, relative to the total reaction mixture.

In observing the above conditions it will generally be found that a satisfactory degree of esterification will have taken place in between about 15 minutes and 5 hours. It is preferable that the reaction period be not extended appreciably more than about 5 hours, under the conditions described, in order to minimize esterification of terephthalic acid. However, under milder conditions, longer esterfication periods may be preferred.

After the desired degree of esterification has taken place the reaction mixture, containing esters, methanol, catalyst and a small amount of water of reaction in the liquid phase, and terephthalic acid in the solid phase, is removed through line 4 and filtered, preferably at approximately the reaction temperature, on filter 5. The precipitate is taken off through line 6 and transferred to a vessel 7 for washing with water which is introduced through line 8. Purified terephthalic acid is removed through line 9. The filtrate from filter 5 consists essentially of a methanol solution of the esters of any acids esterified in vessel 2, together with the sulfuric acid. This mixture is then transferred though line 10 to fractional hydrolysis vessel 11, to which water is admitted through line 12. Hydrolysis is then conducted with heating and agitation for a time sufficient to hydrolyze a major proportion of the terephthalic esters, but insufficient to hydrolyze appreciable proportions of isophthalic, benzoic or toluic esters. The conditions for hydrolysis may be approximately the same as those employed in the esterification step, i. e. reflux or higher temperatures, and atmospheric or higher pressures. It is preferable to maintain in the hydrolysis step a sufficient amount of methanol to provide at least partial miscibility between the organic phase and the aqueous phase at the reaction temperature. For this purpose it is desirable to employ a molar ratio of water to methanol between about 0.5 and 2 for optimum hydrolysis conditions. The excess methanol formed by the hydrolysis reaction may be continuously removed through line 13 and recycled to esterification vessel 2. It may be desirable to employ a rectifier at some point in line 13 in order to remove water which may distill overhead in small quantities along with the methanol.

After the hydrolysis has proceeded to the desired extent the total reaction mixture is removed through line 14 and filtered, preferably at approximately the temperature of hydrolysis, on filter 15. During the hydrolysis the terephthalic acid formed precipitates out as a solid, together with small quantities of the other acids, and these solid materials are removed as precipitate from filter 15 and recycled through line 16 to esterification vessel 2.

The filtrate from filter 15 consists of the unhydrolyzed esters together with small quantities of methanol, water and sulfuric acid. This mixture may be treated in one of two different methods, depending upon the nature of the original mixed acids introduced through line 1. If the mixed acids contained only isophthalic and terephthalic acids the filtrate from filter 15 will consist essentially of isophthalic esters. In this case valve 17 is closed and valve 18 opened so that the filtrate flows through line 19 into hydrolysis vessel 20. Ordinarily the mixture will contain sufficient water to continue the hydrolysis, but if desired additional water may be admitted through line 21. The hydrolysis is continued in vessel 20 until the isophthalic esters are substantially completely hydrolyzed, under the general conditions described for the fractional hydrolysis in vessel 11. The methanol generated by the hydrolysis is recycled through line 22 to esterification vessel 2. The reaction mixture from vessel 20 consists of a slurry of isophthalic acid together with excess water, methanol and sulfuric acid. This mixture is transferred through line 23 to filter 24. The filtrate from filter 24 consists essentially of aqueous sulfuric acid, which may be dehydrated and recycled to esterification vessel 2. The precipitate from filter 24 is transferred through line 25 to washing vessel 26, to which water is admitted via line 27. The purified isophthalic acid is then removed through line 28.

If the original mixture of organic acids contained also benzoic and/or toluic acid, the filtrate from filter 15 may contain, in addition to the isophthalic esters, the esters of benzoic and/or toluic acds. In this illustrative case, valve 18 is closed and valve 17 opened, whereby the liquid filtrate is cooled in heat exchanger 29 and passed through line 30 onto filter 31. The mixture is preferably cooled to between about 0° C. to 50° C., thereby causing solid precipitation of the total ester content, if the benzoic and/or toluic ester content is not too high, e. g. over about 15%. If the ester mixture contains too large a proportion of monobasic esters, e. g. over about 15%, difficulty may be encountered in precipitating the esters as a solid phase due to the formation of eutectics. In this case the esters may form a liquid phase which may be separated by decantation from the aqueous phase. If liquid phaes are formed, the filter 31 is simply replaced by a liquid-liquid phase separator such as a decanter.

The precipitated ester phase from filter 31, or the liquid ester phase from a decanter, is then passed via line 32 into fractionating column 33 where the more volatile methyl benzoate or methyl toluates, if present individually, are removed as overhead through line 34. If both methyl benzoate and methyl toluates are present, they may be separated from each other by fractionation in column 33, the methyl benzoate being taken overhead through line 34, and the methyl toluates removed as a side-cut through line 34a. The bottoms from distillation column 33 consists essentially of isophthalic esters which are then transferred through line 35 to hydrolysis vessel 20 and hydrolyzed as previously described. The filtrate from filter 31 consists essentially of water and sulfuric acid, together with some methanol. This mixture may be transferred through line 36 to hydrolysis vessel 20 in order to provide catalyst and water for the hydrolysis reaction.

As an alternative to removing the monobasic esters after the fractional hydrolysis step they may, if desired, be removed directly after the esterification step, i. e. from the filtrate in line 10. In this modification, the heat exchanger 29 and filter 31, or a corresponding decanter, are interposed into line 10, and the separated ester fraction is fractionally distilled as above described. The residual dibasic esters are then passed into fractional hydrolysis vessel 11 and treated as previously described. The effluent from filter 15 is then passed directly to hydrolysis vessel 20 through line 19.

It is possible to obtain from the esterification procedures described herein either half esters or diesters of the dibasic acids, depending upon the reaction conditions and molar concentrations of the reactants. However, the greater solubility of the half esters in the alcoholic reaction mixture, as compared to the diacids, ordinarily favors the formation of the full diester. In any event, the totally unesterified dibasic acids make up the predominant part of the insoluble residue from the esterification, and the liquid ester fraction may contain a mixture of half-esters and diesters, but very little diacid. Consequently, when the terms "esterify" or "esterification" are applied herein with reference to the dibasic acids, those terms are intended to means either monoesterification or diesterification.

Similarly, in the partial hydrolysis step, either half-esters or the diacids may be formed. In this case the half-esters remain in the liquid phase with the diesters, while the diacids precipitate as a solid phase. "Hydrolysis" is therefore intended to mean hydrolysis of the esters to acids which are largely insoluble in the reaction mixture, i. e. diacids.

The processes as described above are found to provide both terephthalic and isophthalic acids in purities ranging from 90% to over 99%. Ordinarily such purities are sufficient for commercial utilization, but if desired the individual acids may be further purified by conventional washing or subliming procedures.

The following specific examples illustrate typical results which may be obtained in practicing the invention:

*Example I*

A mixture made up of 40 grams terephthalic acid and 60 grams isophthalic acid is esterified at atmospheric pressures and reflux temperature for 30 minutes with 570 grams methanol and about 12 grams concentrated sulfuric acid. The solid unesterified acids are then filtered from the hot reaction mixture and washed with cold water. This precipitate is then found to consist of about 37 grams terephthalic acid and 12 grams isophthalic acid. The filtrate is then topped to remove excess methanol, and transferred to a hydrolysis vessel. About 100 grams of water is added (providing a water/methanol mole ratio of about 2.0) and the mixture is refluxed for several hours, until hydrolysis is complete. The precipitated acid is then filtered from the hydrolysis mixture, and is found to consist of about 47 grams isophthalic acid and 2.5 grams terephthalic acid.

This example shows that a relatively short esterification period results in an incomplete but highly selective esterification of isophthalic acid, with resultant recovery of almost pure isophthalic acid. By prolonging the esterification reaction period, unreacted terephthalic acid may be recovered from the reaction mixture in substantially pure form, while the esterified fraction will contain a slightly higher proportion of terephthalic esters.

*Example II*

The procedure of Example I is repeated except that the esterification reaction is continued for a period of about 5 hours. The unesterified fraction contains about 34 grams terephthalic acid and less than 1 gram of isophthalic acid. Complete hydrolysis of the ester fraction yields a mixed acid consisting of about 58 grams isophthalic acid and 6 grams terephthalic acid.

*Example III*

A mixture made up of 40 grams terephthalic acid and 60 grams isophthalic acid is esterified with 80 grams of methanol and 6 grams concentrated sulfuric acid at about 230° C. in a suitable pressure vessel. The reaction is continued for about 2 hours whereupon the reaction mixture is cooled to about 90° C. and filtered. After washing, the precipitate is found to consist of about 36 grams terephthalic acid with only traces of isophthalic acid.

The filtrate is transferred to a hydrolysis vessel and about 120 grams of water is added. The mixture is partially hydrolyzed by heating at atmospheric reflux for one hour. The precipitate formed, after filtration and washing with cold water, contains about 3 grams terephthalic acid and 7 grams isophthalic acid. This mixture may be further resolved by reesterification in a manner similar to the first esterification procedure.

The filtrate from the partial hydrolysis is then exhaustively hydrolyzed by heating for several hours with added water. The solid material is filtered off and found to consist of isophthalic acid of about 99% purity, and in almost the theoretical yield.

*Example IV*

A xylene oxidation mixture made up of 30 grams terephthalic acid, 49 grams isophthalic acid, 9 grams para-toluic acid, 6 grams meta-toluic acid, 4 grams benzoic acid and about 1 gram ortho-toluic acid is partially esterified with about 120 grams of methanol and 8 grams of sulfuric acid by heating the mixture at atmospheric reflux for 3 hours. The hot mixture is then filtered, and the filtrate transferred to a hydrolysis vessel. The precipitate, after washing with 50/50 water-methanol, is found to consist of about 27 grams terephthalic acid with only traces of other organic acids.

The esterification filtrate is hydrolyzed by heating for about 90 minutes with added water at atmospheric reflux. The precipitate, consisting mostly of terephthalic and isophthalic acids, is removed by filtration. The hydrolysis filtrate is then cooled to about 10° C., causing a sharper separation of the two liquid phases. The phases are separated by decantation, and the ester phase is then transferred to a still equipped with a fractionating column. About 3.5 grams of methyl benzoate is recovered as a first overhead fraction collected at between 195–210° C. A second overhead fraction is collected at between 218–235° C. containing about 14 grams of mixed methyl toluates.

The still bottoms are then transferred to a pressure vessel and hydrolyzed at about 250° C. with added water and sulfuric acid. The hydrolysis mixture is then cooled and filtered, and the filter cake washed with a cold water-methanol mixture. About 40 grams of isophthalic acid are obtained of about 99% purity.

In any of the above examples the methanol may be replaced by equivalent amounts of any other type of esterification agent herein disclosed, e. g. ethanol, propanol, isopropanol, butanol, tert. butanol, cyclohexanol, ethylene, propylene, diethyl ether, dibutyl ether, ethyl acetate, etc. to obtain similar results. In some cases slight modifications in procedure will be required which will be readily apparent to those skilled in the art.

It is apparent that the procedures described herein provide remarkably effective means for obtaining substantial-

I claim:

1. A process for obtaining terephthalic acid from a mixture comprising terephthalic and isophthalic acids which comprises subjecting said mixture to fractional esterification with a lower aliphatic alcohol in the presence of an inorganic acid esterification catalyst, said acid catalyst constituting between about 0.1% and 10% by weight of the total reaction mixture, continuing said esterification for a period of time sufficient to esterify substantially all of said isophthalic acid but insufficient to esterify more than a minor proportion of said terephthalic acid, said period of time in any case not exceeding about 5 hours, separating substantially pure terephthalic acid and an ester fraction from the esterification mixture, subjecting said ester fraction to fractional hydrolysis by heating with a mixture of water, said aliphatic alcohol and said acid catalyst, the mole ratio of water to alcohol in said hydrolysis being between about 0.5 and 2, continuing said hydrolysis for a period of time sufficient to hydrolyze substantially all of of the terephthalic esters contained therein but only a minor proportion of the isophthalic esters, separating said terephthalic and isophthalic acids from the hydrolysis reaction mixture and subjecting them to a second fractional esterification step similar to said first esterification step.

2. A process as defined in claim 1 wherein said lower aliphatic alcohol is methanol, and said esterification and hydrolysis steps are each conducted at between about 70° and 100° C.

3. A process for obtaining terephthalic acid from a mixture comprising terephthalic and isophthalic acids which comprises subjecting said mixture to fractional esterification with a lower aliphatic alcohol in the presence of an inorganic acid esterification catalyst, said acid catalyst constituting between about 0.1% and 10% by weight of the total reaction mixture, continuing said esterification for a period of time sufficient to esterify substantially all of said isophthalic acid but insufficient to esterify more than a minor proportion of said terephthalic acid, said period of time in any case not exceeding about 5 hours, separating substantially pure terephthalic acid from the esterification mixture, adding sufficient water to the liquid residue from said separation to give a molar ratio of water to alcohol between about 0.5 and 2, heating the resulting aqueous mixture still containing the original acidic catalyst for a period of time sufficient to hydrolyze substantially all of the terephthalic ester contained therein but only a minor proportion of the isophthalic ester, separating said isophthalic and terephthalic acids from the hydrolysis mixture and subjecting them to a second fractional esterification similar to said first esterification.

4. A process as defined in claim 3 wherein said lower aliphatic alcohol is methanol and said esterification and hydrolysis steps are each conducted at between about 70° and 100° C.

5. A process for obtaining substantially pure terephthalic acid and isophthalic acid from a mixture thereof with at least one monobasic acid selected from the group consisting of benzoic and toluic acids which comprises subjecting said mixture to fractional esterification with a lower aliphatic alcohol in the presence of an inorganic acid esterification catalyst, said acid catalyst constituting between about 0.1% and 10% by weight of the total reaction mixture, said esterification being continued for a period of time sufficient to esterify substantially all of said isophthalic acid and said monobasic acid but only a minor proportion of said terephthalic acid, separating from the reaction mixture substantially pure terephthalic acid and a liquid ester fraction, subjecting said ester fraction to fractional hydrolysis by heating with a mixture of water, said aliphatic alcohol and said acid catalyst, the mole ratio of water to alcohol in said hydrolysis being between about 0.5 and 2, continuing said hydrolysis for a period of time sufficient to hydrolyze substantially all the terephthalic esters contained in said ester fraction to terephthalic acid but only a minor proportion of the isophthalic esters and monobasic esters to isophthalic acid and monobasic acid respectively, separating the said organic acids formed by hydrolysis and subjecting them to a second fractional esterification similar to said first esterification, subjecting the remaining ester fraction from said fractional hydrolysis to fractional distillation to remove said monobasic esters, and subjecting the residue from said distillation to a second hydrolysis to obtain substantially pure isophthalic acid.

6. A process as defined in claim 5 wherein said lower aliphatic alcohol is methanol and wherein said esterification step and said first hydrolysis step are conducted at between about 70° and 100° C.

7. A process for obtaining substantially pure terephthalic acid and isophthalic acid from a mixture thereof with at least one monobasic acid selected from the group consisting of benzoic and toluic acids which comprises subjecting said mixture to esterification with a lower aliphatic alcohol in the presence of a minor but effective proportion of an acidic esterification catalyst for a period of time sufficient to esterify substantially all of said isophthalic acid and said monobasic acid but only a minor proportion of said terephthalic acid, separating from the reaction mixture a solid phase consisting of substantially pure terephthalic acid and a liquid ester fraction, subjecting said ester fraction to fractional distillation to remove monobasic esters, and subjecting the dibasic ester residue from said distillation to a first hydrolysis for a period of time sufficient to hydrolyze substantially all the terephthalic esters contained therein to terephthalic acid, but only a minor proportion of the isophthalic esters and monobasic esters to isophthalic acid and monobasic acid respectively, removing the said organic acids formed by hydrolysis, subjecting the remaining ester fraction from said hydrolysis to a second hydrolysis to obtain substantially pure isophthalic acid.

References Cited in the file of this patent

UNITED STATES PATENTS

| | | |
|---|---|---|
| 1,848,724 | Jaeger | Mar. 8, 1932 |
| 2,479,066 | Gresham | Aug. 16, 1949 |
| 2,569,440 | Agnew et al. | Oct. 2, 1951 |

FOREIGN PATENTS

| | | |
|---|---|---|
| 623,836 | Great Britain | May 24, 1949 |